US008512468B2

(12) United States Patent
Allouche et al.

(10) Patent No.: US 8,512,468 B2
(45) Date of Patent: Aug. 20, 2013

(54) GEOPOLYMER MORTAR AND METHOD

(75) Inventors: Erez Allouche, Ruston, LA (US); Carlos Montes, Ruston, LA (US)

(73) Assignee: Louisiana Tech University Research Foundation, a division of Louisiana Tech University Foundation, Inc., Ruston, LA (US)

( * ) Notice: Subject to any disclaimer, the term of this patent is extended or adjusted under 35 U.S.C. 154(b) by 275 days.

(21) Appl. No.: 12/972,722

(22) Filed: Dec. 20, 2010

(65) Prior Publication Data

US 2012/0156381 A1 Jun. 21, 2012

(51) Int. Cl.
*C04B 18/06* (2006.01)

(52) U.S. Cl.
USPC .............. 106/705; 106/DIG. 1; 106/600

(58) Field of Classification Search
USPC ................................ 106/705, DIG. 1, 600
See application file for complete search history.

(56) References Cited

U.S. PATENT DOCUMENTS

| | | | |
|---|---|---|---|
| 4,226,630 A | 10/1980 | Styron |
| 5,244,726 A | 9/1993 | Laney et al. |
| 5,810,920 A | 9/1998 | Ueshima et al. |
| 6,632,876 B2 | 10/2003 | Soukatchoff |
| 7,347,896 B2 | 3/2008 | Harrison |
| 2005/0016418 A1 | 1/2005 | Holbek |
| 2007/0125272 A1 | 6/2007 | Johnson |
| 2007/0144407 A1 | 6/2007 | Biscan et al. |

FOREIGN PATENT DOCUMENTS

| | | |
|---|---|---|
| WO | WO 2008/113609 A2 | 9/2008 |
| WO | WO 2009/103480 A1 | 8/2009 |

OTHER PUBLICATIONS

PCT International Searching Authority/US, International Search Report, mailed Apr. 20, 2012, for PCT/US2011/65854, "Geopolymer Mortar and Method."
PCT International Searching Authority/US, Written Opinion of the International Searching Authority, mailed Apr. 20, 2012, for PCT/US2011/65854, "Geopolymer Mortar and Method."
Yunsheng, Z., Wei, S., Qianli, C., and Lin, C., Synthesis and heavy metal immobilization behaviors of slag based geopolymer, Journal of Hazardous Materials 143, 206-213 (2007).
Montes, C. and Allouche, E.N., Geopolymer Grout: Eco-Friendly, High Corrosion Resistance, Bactericide Coating for Manhole Rehabilitation, North American Society for Trenchless Technology (NASTT) No-Dig Show 2010, Paper E-4-03-1 thru E-4-03-10, Chicago, Illinois (May 2-7, 2010).
Breit, W., Acid Resistance of Concrete, Beton 52 H.10, 505-510 (2002).

(Continued)

*Primary Examiner* — Paul Marcantoni
(74) *Attorney, Agent, or Firm* — Jones Walker LLP

(57) ABSTRACT

A geopolymer mortar formed by mixing about 35% to about 45% by weight pozzolanic material, about 35% to about 45% by weight silicon oxide source, about 15% to about 20% by weight alkaline activator solution, and about 0.3% to about 2.5% by weight copper ion source. The pozzolanic material may be fly ash and the silicon oxide source may be sand. The alkaline activator solution may be a sodium hydroxide solution containing sodium silicate. The geopolymer mortar may have a viscosity in the range of about 25,000 to about 50,000 centipoise. The geopolymer mortar may be formed by further mixing one or more additives, such as surfactants, thermal spheres, anti-sagging agents, adhesion primers, or fibers. The geopolymer mortar may be applied as a protective coating on a surface of a structure.

10 Claims, 3 Drawing Sheets

(56) References Cited

OTHER PUBLICATIONS

Davidovits, J., Geopolymer Chemistry and Sustainable Development. The Poly(sialate) Terminology: A Very Useful and Simple Model for the Promotion and Understanding of Green-Chemistry, Proceedings of the World Congress Geopolymer, Saint-Quentin, France (2005).

Diaz, E.I., Allouche, E.N., and Eklund, S., Factors Affecting the Suitability of Fly Ash as Source Material for Geopolymers, Fuel, Elsevier Science, U.K. (Mar. 2009).

Hewayde, E.H., Allouche, E.N., and Nakhla, G.F., The Use of Metakaolin and Geopolymer Cement to Improve Concrete Resistance to Sulfuric Acid Attack, Proceedings 7th International Symposium on Utilization of High-Strength/High Performance Concrete, ACI SP-228, 1453-1466 (2005).

Minarikova, M. and Skvara, F., Fixation of Heavy Metals in geopolymeric materials based on brown coal fly ash, Ceramics-Silikaty 50, 200-207 (2006).

Montes, C. and Allouche, E.N., Evaluation of the potential of geopolymer mortar in the rehabilitation of buried infrastructure, Journal of Structures & Infrastructure Engineering: Maintenance, Management, Life-cycle, Design & Performance, Taylor and Francis, U.K. (2009).

Song, X.J., Marosszeky, M., Brungs, M., Chang, Z.T., Response of Geopolymer Concrete to Sulfuric Acid Attack, Proceedings of the World Congress Geopolymer, Saint-Quentin, France, 157-160 (2005).

Bakharev, T., Resistance of geopolymer materials to acid attack, Cement and Concrete Research, 658-670 (2005).

U.S. Appl. No. 13/289,705, "Cured-In-Place-Pipe Liner Inspection System and Method," Erez Allouche and Shaurav Alam, filed Nov. 4, 2011 (co-peding application).

U.S. Appl. No. 13/594,164, "Incinerator Fly Ash Geopolymer and Method,"Erez Nissim Allouche and Eleazar Ivan Diaz-Loya, filed Aug. 24, 2012 (co-peding application).

U.S. Appl. No. 13/481,494, "Method for Geopolymer Concrete," Erez Nissim Allouche and Eleazar Ivan Diaz-Loya, filed May 25, 2012 (co-pending application).

GEOPOLYMER MORTAR AND METHOD

BACKGROUND

Corrosion and deterioration of concrete pipes, manholes, wet wells, chambers, tunnels, diversion boxes, pump stations, drop structure reservoirs and treatment basins due to sulfuric acid attack is a major concern associated with wastewater conveyance and treatment facilities. Traditional cementitious materials such as Portland cement are inexpensive, but do not offer longevity under wastewater conveyance and treatment conditions. Concrete pipes are chemically attacked when subjected to acids with pH values of 6.5 or lower for extended periods of time. The pH in sewer lines can reach values of 2 or 3, and in some extreme cases 0.5. The highly acidic environment in sewer pipe lines and wastewater treatment facilities significantly reduces the life of these buried structures, causing significant financial losses.

Efforts have been made to address issues with concrete and brick surfaces in wastewater collection and treatment systems such as susceptibility to corrosion, cracking, and lack of long-term durability in harsh environments. For example, additives have been added to Portland cement in an effort to enhance the corrosion resistance of the Portland cement. Attempted additives include silica fume, fly ash, and blast furnace slag. These additives react with $Ca(OH)_2$ present in cement paste to produce C—S—H, which enhances the resistance of the hardened cement paste in environments with pH values above 4.5. Another example of an attempted method of protecting concrete surfaces is the addition of a thin layer of chemically resistant material (e.g., polyurethane, polyurea, epoxy, mortar epoxy, high alumina cement, or asphalt) on the inner surface of concrete pipes or other concrete surfaces. Difficulties with the addition of these thin layers include issues with ensuring adequate bonds between a spray-on coating and the host concrete surface, formation of pinholes that allow sulfuric acid and/or bacteria to penetrate the coating and destroy the bond between the coating and the host concrete surface, ensuring proper coverage at joints of concrete pipes, and construction related damage to the coating during installation. Also, both of these efforts significantly increased costs of construction and operation.

Geopolymers are inorganic alumino-silicate amorphous polymers formed by chemical reactions under highly alkaline conditions between an active pozzolanic material, such as fly ash or metakaolin, and an activator solution (e.g., a mixture of sodium hydroxide and an alkaline silicate such as sodium silicate or potassium silicate). Polymeric chains form when a pozzolanic material comes in contact with an alkaline activator solution. The geopolymer net consists of $SiO_4$ and $AlO_4$ tetrahedra linked together by shared oxygen atoms. Inside the cavities of the geopolymer net, positive ions (e.g., $Na^+$, $K^+$, $Li^+$, $Ca^{2+}$, $Ba^{2+}$, $NH_4^+$, and $H_3O^+$) should be present to balance the negative charge of $Al^{3+}$ so that the aluminum atom can be linked to four oxygen atoms. The following is the empirical formula for geopolymer polysialates:

$$M_n(-(SiO_2)_z-AlO_2)_n \cdot wH_2O,$$

where M is any of the above-mentioned cations, n is the degree of polymerization, z is 1, 2, or 3 indicating the type of geopolymer formed, and w is the number of associated water molecules. For z=1, the net will be of the polysialate type. For z=2, the net will be a poly(sialate-siloxo) type. For z=3, the net will be a poly(sialate-disiloxo) type.

Geopolymers exhibit excellent compressive resistance (up to 120 MPa) and rapid strength gain, with 95% of their ultimate strength achieved in as little as three days under proper curing conditions. Geopolymers also exhibit low vulnerability to chemical attacks, and are practically inert to attack by sulfate salts because they are not based on calcium silicate. Because they are composed of an alkaline silicate net, geopolymers are also inert to alkali-aggregate reaction, which is a common concern with Portland cement.

SUMMARY OF A SELECTED EMBODIMENT OF INVENTION

A geopolymer mortar formed by mixing about 34% to about 46% by weight pozzolanic material, about 34% to about 46% by weight silicon oxide source, and about 15% to about 20% by weight alkaline activator solution, and about 0.3% to about 2.5% by weight copper ion source. The pozzolanic material may be fly ash or metakaolin. The silicon oxide source may be sand. The alkaline activator solution may be composed of a liquid sodium silicate and a sodium hydroxide solution. The geopolymer mortar may be applied to concrete or brick surfaces, and may serve as a corrosion resistant barrier. The copper ion source may provide a bactericidal property to the geopolymer mortar. The geopolymer mortar may have a suitable viscosity for spray application. The geopolymer mortar may be formed by further mixing in one or more additives including, but not limited to, surfactants, thermal spheres, colloidal silicas, adhesion primers, and fibers.

DETAILED DESCRIPTION OF THE SELECTED EMBODIMENTS

The geopolymer coating is a mixture of a pozzolanic material, an alkaline activator solution, a silicon oxide source, and a copper ion source. The pozzolanic material may be class C fly ash, class F fly ash, metakaolin, or any other pozzolanic materials compliant with ASTM C618 and capable of forming a corrosion-resistant and chemically-resistant geopolymer when mixed with an alkaline activator solution. The alkaline activator solution may be a mixture of an alkaline silicate and a sodium hydroxide solution or a mixture of an alkaline silicate and a potassium hydroxide solution. The alkaline silicate may be sodium silicate or potassium silicate.

Figure 1:
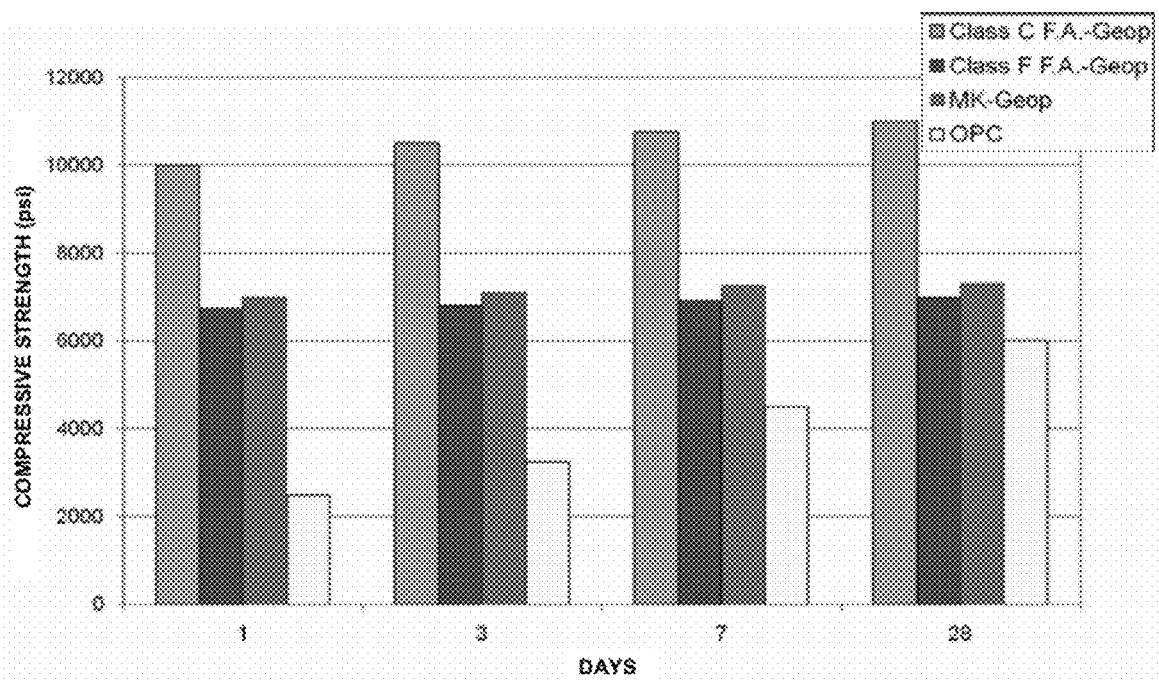
FIG. 1 illustrates experimental results for the compressive strength of geopolymer samples formed with various pozzolanic materials as well as Portland cement samples over a twenty-eight day period.

Initial experimental tests were performed on geopolymer samples prepared with each of three pozzolanic materials, namely class C fly ash, class F fly ash, and metakaolin. A copper ion source was not included in these initial geopolymer samples. The same tests were performed on Portland cement samples for comparison. The geopolymer samples prepared with class F fly ash exhibited good early compressive strength and high corrosion resistance to sulfuric acid. Geopolymer samples formed with class C fly ash displayed high compressive strength at an early stage. Geopolymer samples formed with all three pozzolanic materials resulted in higher early compressive strength than samples formed with Portland cement. FIG. 1 illustrates experimental results for the compressive strength over twenty-eight days of geopolymer samples formed with each of the pozzolanic materials as compared to a Portland cement-silica fume mixture.

Figure 2:
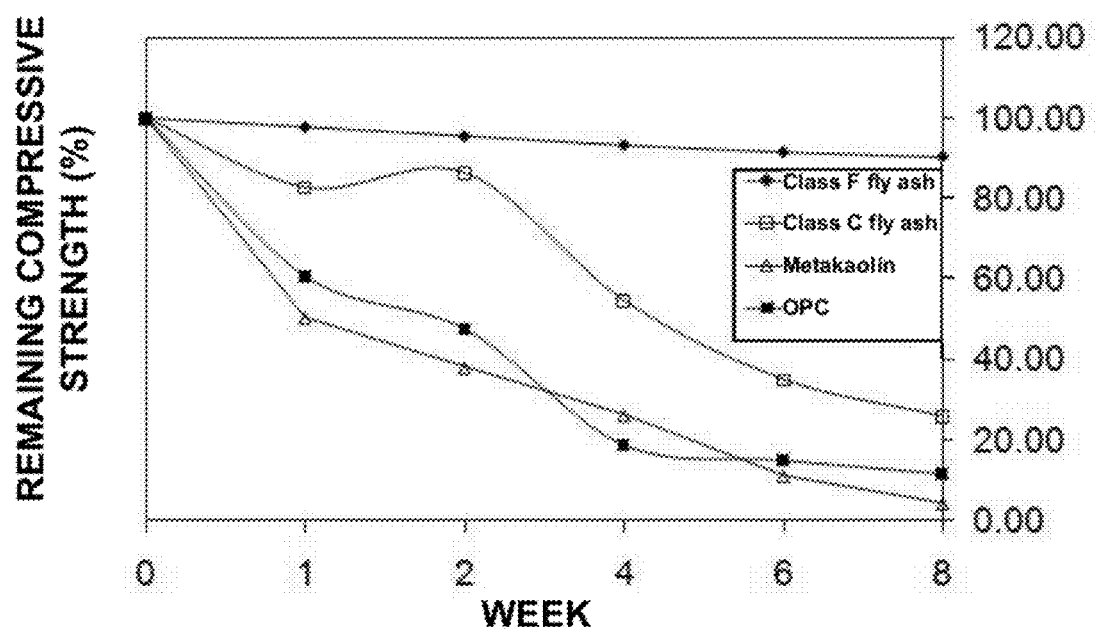
FIG. 2 illustrates experimental results for remaining compressive strength of geopolymer samples formed with various pozzolanic materials as well as Portland cement samples over an eight-week corrosion resistance test period.
Figure 3:
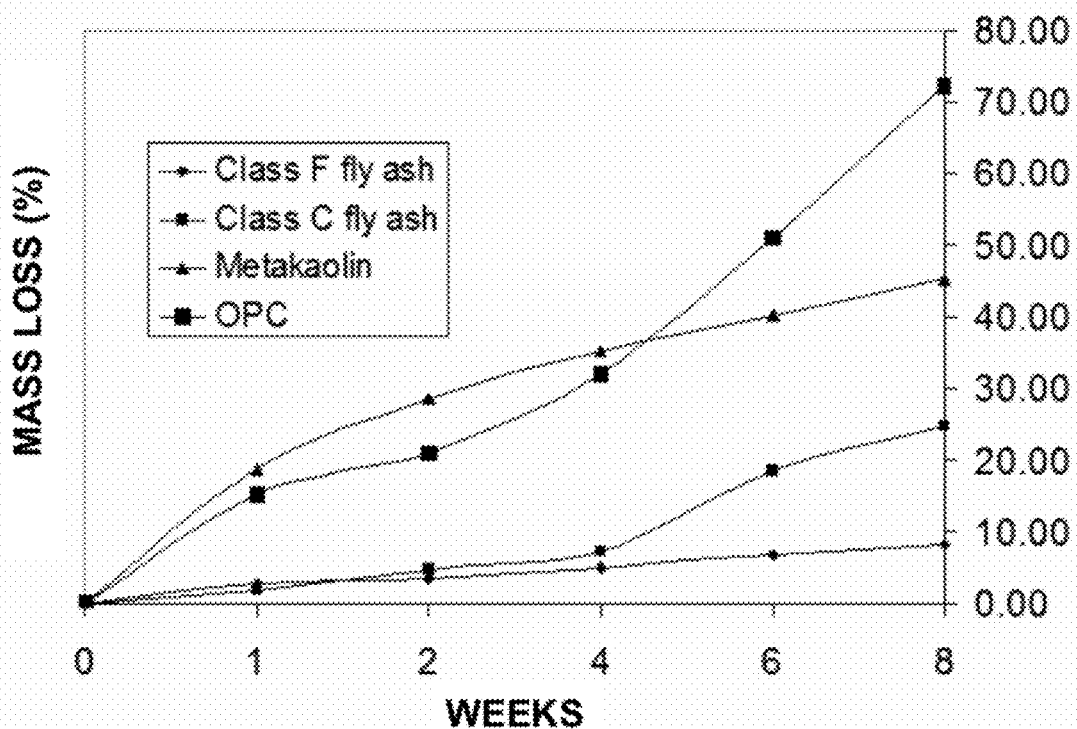
FIG. 3 illustrates experimental results for mass loss in geopolymer samples formed with various pozzolanic materials as well as Portland cement samples over an eight-week corrosion resistance test period.

Experimental corrosion resistance tests were performed on the geopolymer samples prepared with the above three pozzolanic materials and Portland cement samples. The geopolymer samples and the Portland cement samples were exposed to a sulfuric acid solution having a pH of 0.6 for eight weeks. Accelerated corrosion resistance tests provide information about the durability of construction materials used in wastewater related infrastructure. The remaining percentage of each sample's initial compressive strength and the mass loss were measured at one week intervals. Geopolymer samples formed with class F fly ash retained the highest percentage (approximately 90%) of its original compressive strength and lost the smallest percentage (approximately 8%) of its mass over the corrosion resistance test period. It was also determined that class F fly ash provided a longer setting time, which is a critical constructability parameter for rehabilitation projects. Geopolymer samples prepared with class C and class F fly ash displayed retained higher percentages of their initial compressive strength than samples prepared with Portland cement. Geopolymer samples prepared with all three pozzolanic materials result in less mass loss than in samples prepared with Portland cement. FIG. 2 illustrates the remaining percentage of each type of sample's compressive strength over the eight-week corrosion resistance test period. FIG. 3 illustrates the mass loss for each type of sample over the eight-week corrosion resistance test period.

The alkaline activator solution may include a sodium hydroxide solution having a concentration within the range of 6 M to 14 M and sodium silicate having a $SiO_2/Na_2O$ weight ratio within the range of 2.0 to 3.5. The alkaline activator solution may have a sodium silicate to sodium hydroxide weight ratio within the range of 1 to 3. Experimental tests were also performed on geopolymer samples prepared with differing alkaline activator solution parameters, namely, different types of sodium silicates, differing sodium hydroxide concentrations, and differing sodium silicate to sodium hydroxide weight ratios. The tests evaluated the effects of each of these variations on the compressive strength, flow, and corrosion resistance (measured by the remaining percentage of the initial compressive strength and mass loss). The compressive strength was tested using the ASTM C-109 standard test method. The flow of the samples was tested using the ASTM C-1437 standard test method. The mass loss of the samples was tested using the ASTM C-267 standard test method.

The sodium silicate types tested were sodium silicates sold by PQ Corporation under the names D™ sodium silicate, N® sodium silicate, and Star™ sodium silicate. D™ sodium silicate has a $SiO_2/Na_2O$ weight ratio of 2.00. N® sodium silicate has a $SiO_2/Na_2O$ weight ratio of 3.22. Star™ sodium silicate has a $SiO_2/Na_2O$ weight ratio of 2.50. The test results indicated that geopolymer samples prepared with activator solutions containing D™ sodium silicate showed higher compressive strength. The compressive strength of the geopolymer samples formed with activator solutions having D™ sodium silicate was nearly double the compressive strength of geopolymer samples prepared with N® sodium silicate and Star™ sodium silicate. D™ sodium silicate significantly hindered flow, while geopolymer samples made using N® sodium silicate and Star™ sodium silicate exhibited superior flow characteristics.

The sodium hydroxide concentrations tested were 6 M, 10 M, and 14 M. The compressive strength was found to be directly related, and nearly directly proportional, to the molarity of the sodium hydroxide solution. The geopolymer samples prepared with the 14 M sodium hydroxide solution displayed higher compressive strength than the geopolymer samples prepared with the 10 M and 6 M sodium hydroxide solutions. The concentration of sodium hydroxide in the alkaline activator solution was found to be inversely related to the tendency of the geopolymer samples to flow. The 14 M sodium hydroxide solution resulted in a geopolymer sample displaying lower flowability than the 10 M and 6 M sodium hydroxide solutions, following a nearly linear trend.

The sodium silicate to sodium hydroxide weight ratios tested were 1, 2, and 3. The sodium silicate to sodium hydroxide weight ratio was found to have a relatively minor effect on compressive strength, with geopolymer samples made with weight ratios of 2 and 3 exhibiting lower compressive strength values than geopolymer samples made with weight ratios of 1. There was a linear relationship between the sodium silicate to sodium hydroxide weight ratio and the flowability of the geopolymer. The geopolymer samples made with weight ratios of 1 were more viscous and thus less flowable than geopolymer samples made with weight ratios of 2 and 3, following a linear trend.

The geopolymer coating may be formed by mixing components including about 35% to about 45% by weight pozzolanic material, about 35% to about 45% by weight silicon oxide source, about 15% to about 20% by weight alkaline activator solution, and about 0.3% to about 2.5% by weight copper ion source. The pozzolanic material may be fly ash and the silicon oxide source may be sand. The fly ash may have a combined $SiO_2$ and $Al_2O_3$ content of at least 50% by weight, a $SiO_2/Al_2O_3$ weight ratio of about 1.5 to about 3, and a CaO content in the range of about 1% to about 2.5% by weight. The pozzolanic material having these parameters may be predominantly class C fly ash or class F fly ash. The sand may be microsilica sand or river sand. The alkaline activator solution in the geopolymer coating may be made with sodium silicate having a $SiO_2/Na_2O$ weight ratio in the range of about 3.1 to about 3.3 and a sodium hydroxide solution having a molarity in the range of 10 M to 12.5 M. The alkaline activator solution may have a sodium silicate to sodium hydroxide weight ratio in the range of about 1.3 to about 1.7. The viscosity of the alkaline activator solution may be less than 200 centipoise (cP).

The copper ion source may be a copper salt. When mixed with other components of the geopolymer coating, the copper salt may provide copper ions which serve as replacement cations for the missing charge for some aluminum sites in the geopolymer structure. The copper replacement cations provide a bactericidal property to the copper-substituted geopolymer coating. Suitable copper salts for use in the geopolymer coating include, but are not limited to, $CuSO_4$, $Cu_2O$, $Cu(NO_3)_2$, and $Cu(NO_3)_2 \cdot 3H_2O$. For example, the geopolymer coating may include copper (II) sulfate in an amount of about 0.825% to about 4.125% of the dry weight of the pozzolanic material. In another embodiment, the geopolymer coating may include copper (II) nitrate in an amount of about 1.25% to about 6.52% of the dry weight of the pozzolanic material. Other potential copper salts include, but are not limited to, $Cu_2S$, $CuS$, $CuCO_3 \cdot Cu(OH)_2$, and $Cu(OH)_2$.

Experimental tests were performed to determine which of $Cu_2O$, $CuSO_4$, and $Cu(NO_3 \cdot 3H_2O)$ was the most appropriate copper ion source for the formation of copper-substituted geopolymer coatings. X-ray diffraction tests were performed on samples to evaluate the presence of unreacted salts or oxides. Test results indicated the complete dissolution of the copper salts into the mixture, but the CuO remained unreacted. EDS-SEM tests were conducted on a 50% $CuSO_4$ sample. The EDS-SEM test results indicated a higher concentration of copper ions on the amorphous (geopolymerized material) portion of the matrix indicating a strong likelihood of cation replacement within the geopolymer molecule. A Scanning Transmission Electron Microscope (STEM) analysis of the geopolymer coating material revealed that the glass (crystalline) material examined did not contain dispersed crystalline copper-bearing material. This further supports the notion that the copper, at least partially, is in the amorphous phase as a cation replacement within the geopolymer molecule.

The geopolymer coating may further include one or more additives to enhance the geopolymer coating viscosity and/or reduce surface tension. These additives may include, but are not limited to, super plasticizers, water reducers, retardant admixtures, and surfactants. In one embodiment, surfactants may be mixed in with the other components to enhance geopolymer viscosity and surface tension. For example, a saturated Vinsol resin sold commercially under the name "Air Plus" by Fritz Pak™ may be mixed in with the other components when preparing the geopolymer coating in the amount of at least 0.03% by weight, and more preferably in the range of about 0.1% to about 0.2% by weight. Alternatively, other wood resin salt surfactants or synthetic detergent surfactants may be mixed into the geopolymer coating. The viscosity of the geopolymer coating may be within the range of about 10,000 to about 75,000 cP, and more preferably within the range of about 25,000 to about 50,000 cP.

Anti-sagging agents may also be mixed in with the other components to form the geopolymer coating. For example, a colloidal silica, sodium carboxymethyl cellulose-based fillers, or similar cellulose-based additives may be added in the formation of the geopolymer coating. The amount of any anti-sagging agent included may depend upon the desired thickness of the geopolymer coating. The geopolymer coating may have a flowability per ASTM C1437 of about 80% to about 100%.

Other additives may be included in the geopolymer coating. For example, fibers (e.g., fiber glass, polypropylene, polyvinyl alcohol, carbon fibers and similar filler materials) may be mixed in when preparing the geopolymer coating to enhance flexural strength and to aid in controlling surface cracks in the geopolymer coating. The amount of fibers added may be in an amount in the range of about 0.01% to about 5% of the dry weight of the pozzolanic material, and more preferably, in the range of about 0.01% to about 1% of the dry weight of the pozzolanic material. Alternatively, the amount of fibers may be 0.0004% to about 0.4% by weight of the mixture. Also, a primer (e.g., X48) may be mixed in when preparing the geopolymer coating to improve adhesion between the applied geopolymer coating and the host surface. Thermal capsules or microspheres may be included in the geopolymer coating to accelerate the curing process. A setting retardant such as boric acid may also be included in the geopolymer coating.

The geopolymer coating may be formed by first preparing the activator solution. A sodium hydroxide solution having a molarity within the range of about 10 M to about 12.5 M may be prepared. For example, one liter of a 12.5 M sodium hydroxide solution may be prepared by dissolving 500 g of sodium hydroxide pellets in water to make one liter of solution. The solution may be allowed to cool to room temperature before use. Next, a powder surfactant may be partially suspended in water to assure its even distribution in the mixture. An amount of suspended surfactant equal to approximately 0.1% to about 0.2% by weight of the resultant geopolymer coating may be immediately added to an amount of sodium silicate in a mixer to reduce its surface tension. A conventional mortar mixer may be used. The sodium silicate may have a $SiO_2/Na_2O$ weight ratio of about 3.1 to about 3.3. The sodium silicate and the sodium hydroxide may then be added together to the mixer in a sodium silicate to sodium hydroxide weight ratio of about 1.3 to about 1.7.

An amount of fly ash may be added to the mixer containing the activator solution. The fly ash may be added in an amount such that the geopolymer coating is about 35% to about 45% by weight of fly ash and about 15% to about 20% by weight activator solution. To form a copper-substituted geopolymer coating, a copper salt may be premixed with the fly ash before adding the fly ash to the mixer. The fly ash may be mixed with the activator solution for at least 30 seconds or until no dry material is observed. An amount of sand may then be added to the mixer evenly for another period of at least 30 seconds. The sand may be added to the mixer in an amount such that the geopolymer coating is about 35% to about 45% by weight sand. Alternatively, equal parts of sand and fly ash may be added to the mixer. Mixing must continue until all components are fully mixed into a paste. Additional fly ash or water may be added until a substantially homogeneous paste is formed with a viscosity of about 25,000 cP to about 50,000 cP. An anti-sagging agent, such as colloidal silica, may then be added.

The geopolymer coating may be poured and fed into a pump and sprayer. Spray application may be conducted in a manner similar to the application of Portland cement-based grout. Spraying may be continued until the desired thickness of the geopolymer coating is achieved on the parent surface. In a preferred embodiment, thickness of up to one inch may be achieved in a single application. If the required thickness requires the application of multiple coats, the geopolymer coating may be allowed to dry before application of subsequent coats in order to avoid sagging.

The geopolymer surface may be finished using a conventional stainless steel trowel, or any other tool capable of finishing a cementitious material. After finishing, the geopolymer coating may be allowed to air-cure at ambient temperature for twenty-four hours before steam curing or may be subjected to accelerated curing using steam to yield satisfactory performance of the geopolymer coating. Steam curing may be accomplished with a portable steam generator unit or any other boiler. The geopolymer coating may be steam cured at 100° C. for a period of up to twenty-four hours in order to achieve a higher level of geopolymerization. More preferably, the geopolymer coating may be steam cured for a period of about eight hours. Geopolymer coatings containing thermal microcapsules may cure at an accelerated pace.

Mechanical characteristics of a geopolymer coating having the following characteristics were measured: approximately equal amounts by weight of fly ash and sand, an alkaline activator solution to fly ash ratio of about 0.45, a sodium silicate to sodium hydroxide weight ratio of about 1.5, a surfactant in the amount of about 0.375% of the weight of the fly ash, and a copper salt in the amount of about 0.825% to about 6.25% of the weight of the fly ash. Table 1 shows mechanical characteristics of this copper-substituted geopolymer material once hardened.

TABLE 1

| TEST | ASTM | VALUE |
|---|---|---|
| Compressive Strength (cubes) | C-109 | |
| 24 hours | | 6121 psi |
| 3 days | | 6475 psi |
| 7 days | | 6960 psi |
| 28 days | | 7010 psi |
| Compressive Strength (cylinders), 24 hours | C-78 | 5338 psi |
| Flexural Strength (24 hours) | C-580 | 876 psi |
| Tensile Strength (24 hours) | C-307 | 385 psi |
| Young's Modulus | C-469 | 1717 psi |
| Poisson Ratio | C-469 | 0.16 |
| Corrosion Resistance | C-267 | |
| Remaining compressive strength | | 70% |
| Mass loss | | 12.7% |
| Absorption after immersion | C-642 | 4.75% |
| Volume of permeable voids | C-642 | 12.30% |
| Air content | C-231 | 14% |
| Abrasion resistance | C-774 | 533.5 |
| Bond Strength | D-4541 | 1400 |
| Initial Viscosity (paste) | — | 43,000 cPoise |
| Viscosity after 30 minutes | — | 20,000 cPoise |
| Pot Life | C-403 | less than 3 hours |

In an alternate embodiment, the geopolymer coating may be formed by mixing components including about 34% to about 46% by weight pozzolanic material, about 34% to about 46% by weight silicon oxide source, about 15% to about 20% by weight alkaline activator solution, and about 0.3% to about 2.5% by weight copper ion source. The pozzolanic material may be fly ash and the silicon oxide source may be sand. The fly ash may have a combined $SiO_2$ and $Al_2O_3$ content of at least 50% by weight, a $SiO_2/Al_2O_3$ weight ratio in the range of about 1.5 to about 3, and a CaO content of less than about 10% by weight, and more preferably less than about 5% by weight. The alkaline activator solution in the geopolymer coating may include an 8 M to 14 M NaOH solution and sodium silicate with a $SiO_2/Na_2O$ weight ratio in the range of about 2.8 to about 3.5, and a sodium silicate to sodium hydroxide weight ratio in the range of about 1.0 to about 2.0. The viscosity of the geopolymer coating may be in the range of about 5,000 to about 100,000 centipoise (cP), and more preferably in the range of about 10,000 to about 75,000 cP. The flowability of the geopolymer coating (as per ASTM C1437) may be in the range of about 40% to about 150%. The geopolymer coating may further include at least about 0.03% by weight surfactant. The surfactant may include a salt of wood resin or a synthetic detergent. A method of protecting a surface may include applying to the surface this geopolymer coating.

In another alternate embodiment, the method of forming the geopolymer paste may include providing an activator solution including an 8 M to 14 M NaOH solution having sodium silicate with a $SiO_2/Na_2O$ weight ratio in the range of about 2.8 to about 3.5 and a sodium silicate to sodium hydroxide weight ratio in the range of about 1.2 to about 1.8. The activator solution may form about 15% to about 20% by weight of the geopolymer paste. The method may also include mixing with the activator solution an aggregate which may form about 34% to about 46% by weight of the geopolymer paste. The fly ash may be mixed with the activator solution, and the fly ash may form about 34% to about 46% by weight of the geopolymer paste. The mixing may continue until a substantially homogenous paste is achieved. The viscosity of the geopolymer paste may be in the range of about 5,000 and about 100,000 centipoise (cP), and more preferably in the range of about 10,000 to about 75,000 cP. A surfactant may be added to the activator solution, and the surfactant may form at least 0.03% by weight of the geopolymer paste. The method may further include spraying the geopolymer paste onto a structure exposed to waste water while the geopolymer paste maintains a viscosity in the range of about 5,000 to about 100,000 cP, and more preferably in the range of about 10,000 to about 75,000 cP.

In yet another embodiment, the method of forming the geopolymer paste may include providing an activator solution including a 10 M to 12.5 M NaOH solution having sodium silicate with a $SiO_2/Na_2O$ weight ratio in the range of about 3.1 to about 3.3 and a sodium silicate to sodium hydroxide weight ratio in the range of about 1.3 to about 1.7. The activator solution may form about 15% to about 20% by weight of the geopolymer paste. The method may also include mixing with the activator solution an aggregate which may form about 35% to about 45% by weight of the geopolymer paste. The fly ash may be mixed with the activator solution, and the fly ash may form about 35% to about 45% by weight of the geopolymer paste. The mixing may continue until a substantially homogenous paste is achieved. The viscosity of the geopolymer paste may be in the range of about 25,000 and about 50,000 centipoise (cP). A surfactant may be added to the activator solution, and the surfactant may form about 0.1% to about 0.2% by weight of the geopolymer paste. The method may further include spraying the geopolymer paste onto a structure exposed to waste water while the geopolymer paste maintains a viscosity in the range of about 25,000 to about 50,000 cP.

The various embodiments of the geopolymer coating offer high corrosion resistance, bactericidal properties, low costs of production, and rapid and easy application. The geopolymer coating may have enhanced viscosity and surface tension suitable for its application as a mortar coating using manual or mechanical means.

The geopolymer coating may be used as a protective coating for the rehabilitation and reconstruction of concrete or brick surfaces of structures used for the transportation, storage, and treatment of wastewater streams from municipal and industrial sources including, but not limited to, pipes, manholes, wet wells, chambers, tunnels, diversion boxes, pump stations, drop structures, reservoirs, clarifiers, and primary and secondary retention and treatment basins. The geopolymer coating may also be used as a coating for tunnels and mine shafts where acidic conditions are the main source of deterioration of the supporting structures. The geopolymer coating may be applied using conventional techniques for cementitious linings including, but not limited to, spraying, pumping, flooding, and trowelling.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

The invention claimed is:

1. A composition of matter formed by the mixing of the components comprising:
    (a) about 35% to about 45% by weight fly ash;
    (b) about 35% to about 45% by weight sand;
    (c) about 15% to about 20% by weight alkaline activator solution;
    (d) about 0.3% to about 2.5% by weight copper ion source; and
    (e) about 0% to about 2.2% by weight fibers.

2. The composition of matter according to claim 1, wherein the fly ash is predominantly class C or class F fly ash.

3. The composition of matter according to claim 2, wherein a combined $SiO_2$ and $Al_2O_3$ content of the fly ash is at least 50% by weight, a $SiO_2:Al_2O_3$ ratio is about 1.5 to about 3, and a CaO content of the fly ash is about 1% to about 2.5% by weight.

4. The composition of matter according to claim 1, wherein the activator solution comprises a 10 M to 12.5 M NaOH solution including sodium silicate with a $SiO_2/Na_2O$ weight ratio of about 3.1 to about 3.3 and a sodium silicate to sodium hydroxide weight ratio of about 1.3 to about 1.7.

5. The composition of matter according to claim 1, wherein the viscosity of the composition is about 25,000 to about 50,000 centipoise (cP).

6. The composition of matter according to claim 5, wherein the composition further comprises an anti-sagging agent and has a flowability as per ASTM C1437 of about 80% to about 100%.

7. The composition of matter according to claim 1, wherein the copper ion source is at least one of $CuSO_4$, $Cu_2O$, $Cu(NO_3)_2$, and $Cu(NO_3)_2.3H_2O$.

8. The composition of matter according to claim 1, wherein the copper ion source is at least one of $Cu_2S$, CuS, $CuCO_3.Cu(OH)_2$, and $Cu(OH)_2$.

9. The composition of matter according to claim 1, further comprising about 0.1% to about 0.2% by weight surfactant.

10. The composition of matter according to claim 9, wherein the surfactant comprises a vinsol resin surfactant.

* * * * *